July 1, 1952   L. E. DAVIES   2,601,914
MECHANISM FOR TRANSFERRING CONTAINERS AND THE LIKE
Filed May 7, 1946   2 SHEETS—SHEET 1
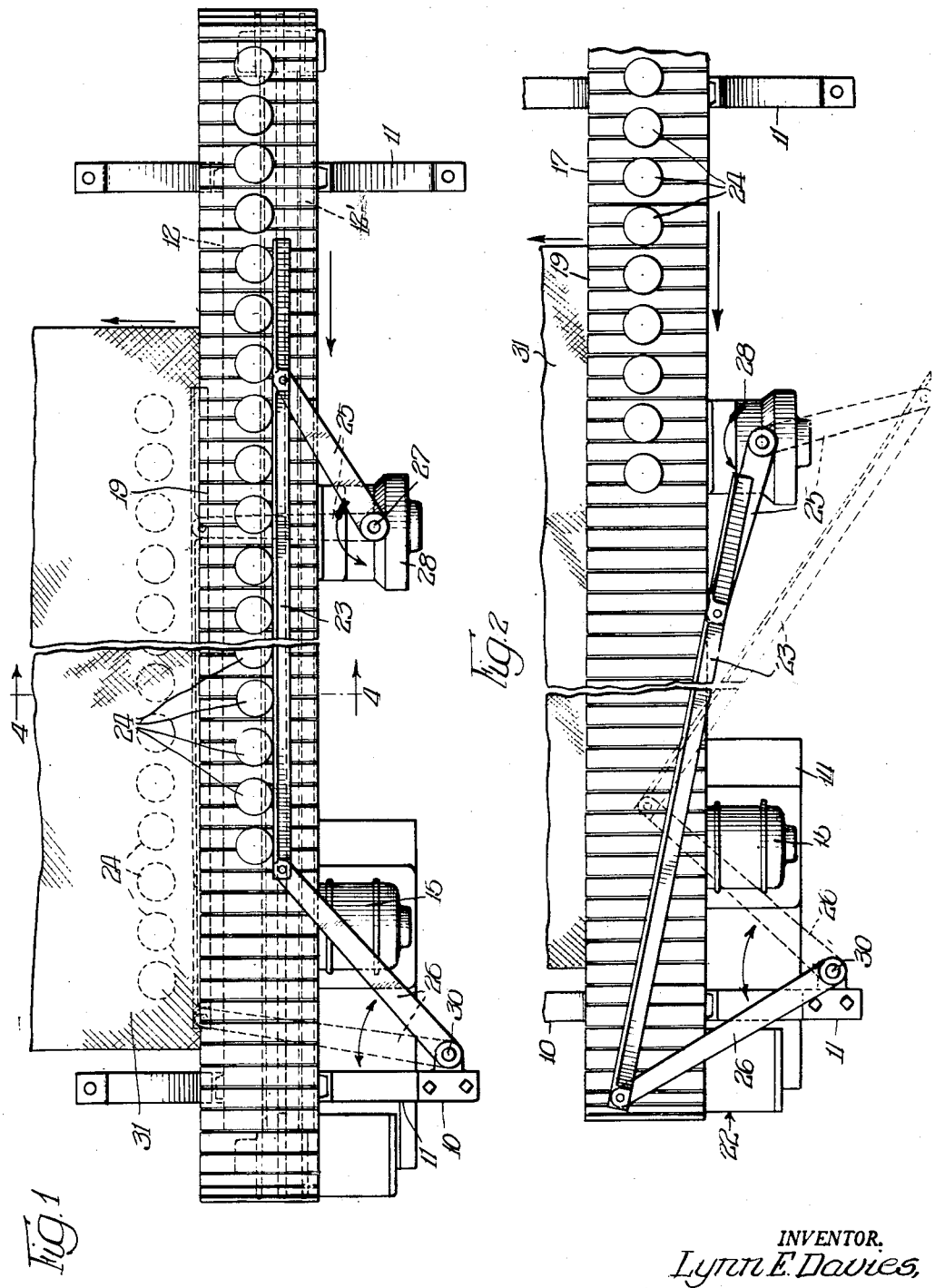
INVENTOR.
Lynn E. Davies,
BY
Cromwell, Greist + Warden
ATTYS July 1, 1952 — L. E. DAVIES — 2,601,914
MECHANISM FOR TRANSFERRING CONTAINERS AND THE LIKE
Filed May 7, 1946 — 2 SHEETS—SHEET 2
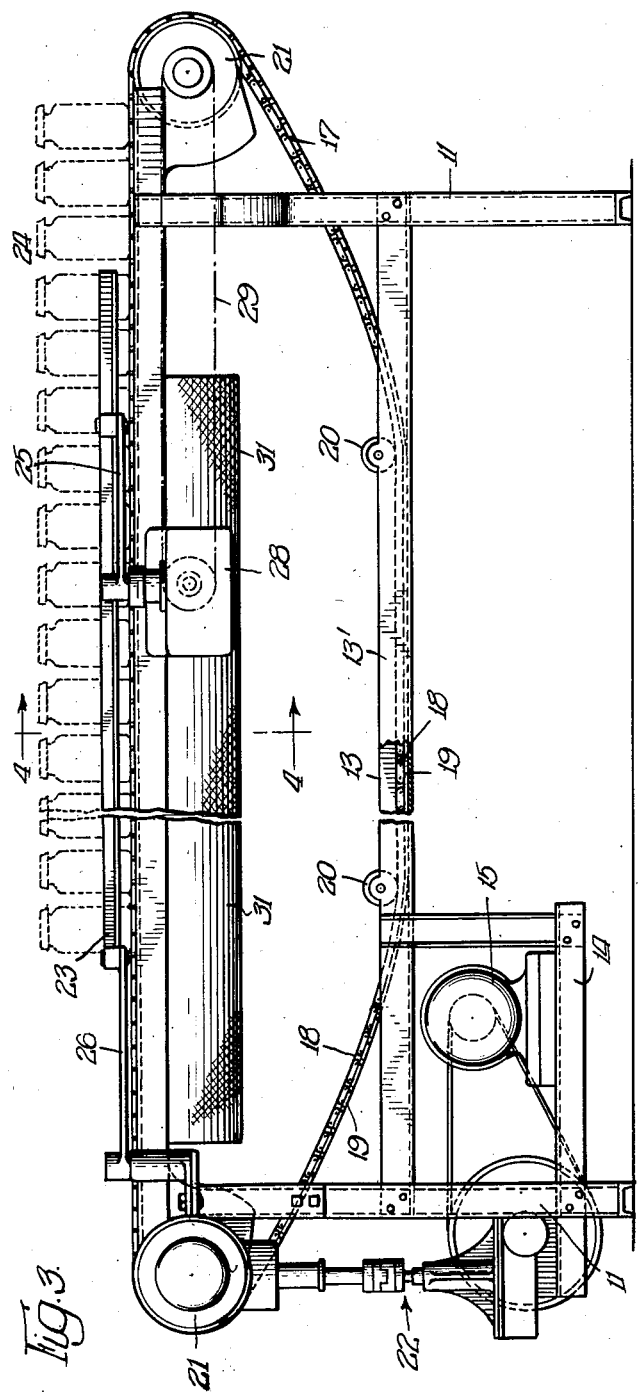
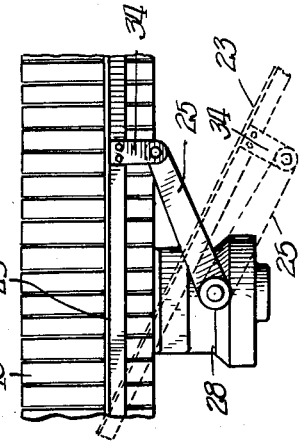
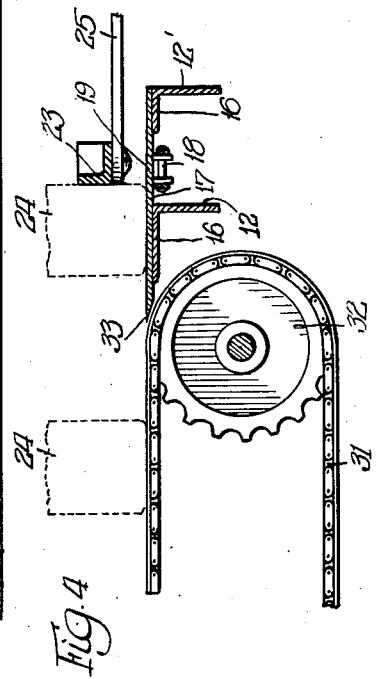
INVENTOR.
Lynn E. Davies,
BY
Cromwell, Greist & Warden
Attys Patented July 1, 1952

2,601,914

UNITED STATES PATENT OFFICE 2,601,914

MECHANISM FOR TRANSFERRING CONTAINERS AND THE LIKE

Lynn E. Davies, Park Ridge, Ill., assignor to White Cap Company, Chicago, Ill., a corporation of Delaware Application May 7, 1946, Serial No. 667,859

13 Claims. (Cl. 198—31)

This invention pertains to improvements in a mechanism for transferring a plurality of articles carried longitudinally in predetermined spaced relation by one conveyor onto another conveyor moving at an angle thereto or to a station at one side of the first conveyor, for further handling or treatment of the articles, the invention being particularly concerned with mechanism of this type as it is employed in the food processing and packing industry.

It is an object of the invention to provide a transfer mechanism of the type described effective to shift a group of articles traveling seriatim on one continuously moving conveyor onto an angularly traveling conveyor, or to a similar station, the movement of a transfer member of said mechanism being so correlated with the speed of the conveyors that the transfer is effected uniformly and unfailingly without overturning or damaging the articles, and without disturbing the spacing of the articles.

Yet another specific object is to provide an article transfer mechanism of the foregoing character including an elongated push bar and means to actuate the same through an approximately orbital path including components of travel longitudinally of and transversely of the path of a continuous conveyor with which the push bar is associated, thereby to push articles off said conveyor onto a receiving station at one side of the latter, in which mechanism the means for causing orbital travel of the push bar imparts a further component of pivotal movement thereto, so as to swingingly translate the rear end of the bar about the leading article on the conveyor, in a direction away from the receiving station, thus to avoid interference with the leading article, and at the same time to reduce the total space required for the operation of the mechanism.

It is a further object of the invention to provide a transfer mechanism of the type described which occupies a minimum of space in its operation.

Yet another object is to provide a transfer mechanism including an elongated push bar for forwarding a group of articles, arranged in an advancing line on one conveyor, as a row onto an angularly traveling conveyor, characterized by novel, simplified provisions for actuating said bar.

More specifically, an object of the invention is to provide a transfer mechanism including an elongated push bar adapted to contact a row of articles on one conveyor along a line generally paralleling the direction of movement of said conveyor throughout the actual transfer operation, in combination with combined rotary and oscillatory actuating means connected to the bar in a manner to maintain said parallel relation until the transfer is effected, said rotary and oscillatory means having the advantage of occupying a minimum of space in operation, considering the nature thereof, and being characterized by great simplicity and economy of its parts and assembly.

Still more specifically an object of the invention is to provide a transfer mechanism of the type described including a laterally and longitudinally shiftable push bar actuated by a novel linkage including rotary and oscillatory arms for the purpose of reducing the space requirements of the mechanism and simplifying the operating instrumentalities for the push bar.

The foregoing statements are indicative in a general way of the nature of the invention, but other and more specific objects will be apparent to those skilled in the art upon a full understanding of the construction and operation of the device.

Two embodiments of the invention are presented herein for purpose of exemplification, but it will be appreciated that the invention is susceptible of incorporation in other modified forms coming equally within the scope of the appended claims.

In the drawings,

Fig. 1 is a fragmentary top plan view of the transfer mechanism of this invention, illustrating in solid and dotted lines the motions of certain of the parts in the functioning of the mechanism;

Fig. 2 is a fragmentary view similar to Fig. 1 but considerably simplified as compared thereto, illustrating in solid and dotted lines the further successive positions of the referred to transfer parts in their return stroke following the transferring operation;

Fig. 3 is a view, partially broken away and in front elevation, of the mechanism, illustrating the driving instrumentalities for the conveyor and push bar components of the mechanism;

Fig. 4 is a fragmentary view in transverse vertical section on a line generally corresponding to line 4—4 of Figs. 1 and 3; and Fig. 5 is a fragmentary top plan view illustrating a detail of the push bar and operating linkage therefor in accordance with a modified form of the invention.

The present invention pertains to an improved mechanism for effecting the transfer of articles, in particular food containers and the like, in longitudinal rows from an elongated conveyor traveling continuously in the direction of the length of the row, onto a transversely moving conveyor. A specific example of the application of such a transfer mechanism is found in the food packing industry, wherein jars or like containers, upon discharge from sterilizing, cooking or similar apparatus, are required to be thoroughly cooled prior to labeling and packaging for storage. In the cooling operation, it is desirable to dispose the containers in spaced relation upon an open type chain conveyor of considerable width, by which the containers are passed through a cooling station and under spray cooling means in the latter. This invention affords a novel transfer mechanism adapted to be disposed between the point of discharge of containers from such sterilizing or cooking apparatus and the cooling conveyor for the purpose of conveying the containers longitudinally from the discharge point and laterally transferring desired numbers of containers, arranged in rows, onto the cooling conveyor, with the containers in properly spaced relation for the cooling operation. The push bar of the mechanism moves longitudinally in its operation of shifting the articles laterally, this composite movement eliminating the possibility of overturning the containers or disturbing their spaced relationship while traveling. At the same time great economy in operating space is effected, employing a movement or linkage of a very simple and inexpensive character.

Referring to the drawings, and in particular to Figs. 1 and 3, the mechanism comprises a frame, generally designated 10, including a pair of spaced angle iron uprights 11 and pairs of longitudinal upper and lower members 12, 12' and 13, 13', respectively, extending between the uprights and appropriately secured thereto, as by bolting, welding or the like. These longitudinal members are of angled, L-shaped section and perform further functions to be hereinafter described. Other appropriate bracing and rigidifying provisions for the frame may be employed. As illustrated in Fig. 3, a substructure or platform 14 is hung from the left-hand upright and the longitudinal member 13' to support a driving motor 15 for the mechanism.

Particular attention is directed to Fig. 4 illustrating the disposition of the longitudinal members 12, 12' referred to above. In each case these members are in the form of angle irons disposed in horizontal pairs in spaced parallel relation to one another. The outer surface of the flanges 16 thereof is exposed horizontally at the top to support the upper flight of the articulated slat-type conveyor 17 in the horizontal movement of said flight. The space between the two channel members 12 accommodates the links of a chain 18 to which the slats 19 of said conveyor 17 are secured. The lower pair of longitudinal members 13, 13' are also spaced parallel to one another with the outer surfaces of the flanges thereof disposed horizontally and on the bottom side, whereby said flanges sustain the lower flight of conveyor 17, as illustrated in Fig. 3. A pair of idler rollers 20 are appropriately mounted between the upright flanges of members 13, 13' to guide the conveyor.

Conveyor 17 is trained around spaced end drums or sprockets 21, one of which is driven from motor 15 at an appropriate speed through a conventional belt drive, reduction gearing and coupling. These power transmission instrumentalities are designated generally as a group by the reference numeral 22, since the particular manner of driving the conveyor 17 is not important in the present invention.

The longitudinally and laterally shiftable push bar of the mechanism is designated by the reference numeral 23. This bar is in the form of an elongated length of angle iron material disposed with one of its outer flange surfaces upright and facing the conveyor 17. The push bar is spaced slightly above the upper surface of the conveyor slats 19 for stability in engaging the articles thereon, i. e., containers or the like 24, to insure against upsetting the same in transference. Push bar 23 is actuated in a combined rotary-oscillatory arm and link movement by a pair of arms 25, 26 which are pivoted to the bar at substantially spaced points adjacent the bar ends.

An important feature of the invention resides in the fact that the arm 25 travels in a 360° rotary path, whereas the arm 26 is oscillatory in character, traveling through a comparatively limited angular sweep. Arm 25 is secured to a vertically extending shaft 27 and driven by a speed reduction device 28, the latter being appropriately supported on the forward side of frame 10. The speed reduction device in turn derives its power from the conveyor drum or sprocket 21 at the side of the machine mechanism opposite the transmission 22, through an operating chain 29. Hence, arm 25 is caused to rotate unidirectionally at a predetermined uniform speed correlated with the movement of the conveyor 17, while said conveyor is moving. This speed is such that the longitudinal speed of the bar 23 driven by the arm equals or approximates the conveyor speed as it engages the containers 24 and transfers the same laterally across and off said conveyor.

The second oscillatory arm 26 is simply pivoted on the frame 10 by a pin or shaft 30 carried on the frame, being adapted for reversing angular movement as indicated in Fig. 1. It travels through a limited angle, usually well under 180°, although the extent of its sweep is obviously dependent on the relation of its length to that of arm 25. However, arm 26 does not swing laterally outwardly of a line through its pivot on the frame and parallel to conveyor 17. Push bar 23, under actuation by arms 25 and 26, functions to transfer a predetermined number of articles in a row onto the open mesh, chain belt-type conveyor 31, by which said articles are carried away. The length of bar 23 approximates the width of said conveyor. Conveyor 31 is trained around appropriate pulleys or sprockets 32, one of which is shown in Fig. 4, and is driven appropriately at a speed such that the rows of articles 24 transferred thereto are carried away in uniform longitudinally spaced relation thereon.

Referring to Fig. 4, it is seen that the conveyor 31 extends substantially underneath the discharge edge 33 of the slats 19 of conveyor 17, likewise that said discharge edge is feathered on its under side toward the conveyor 31 for a smooth, shock-free feed of the articles onto conveyor 31. To this end the operating chain 18 of conveyor 17 is positioned substantially to one side of the midpoint of slats 19 in the space between the longitudinal members 12, 12', which are located accordingly. This permits bringing the pulley or drum for conveyor 31 well under the discharge edge 33 of the slat elements 19, as described.

In operation, with the conveyor 17 traveling from right to left as viewed in Fig. 1, the push bar 23 engages the sides of a number of articles 24 at the commencement of the actual transfer phase of the cycle of the mechanism. At this time the bar is in a position, shown in solid lines, paralleling the length of conveyor 17, or approximately so. It moves laterally and longitudinally in this parallel relationship until the containers are discharged onto conveyor 31, by reason of the proportioning of the lengths and spacing of the arms 25 and 26. It will be noted that throughout the movement of the bar 23 the oscillatory arm 26 is driven entirely from the power actuated rotary arm 25, the push bar functioning as a connecting thrust link to this end.

At the point in the cycle of operation at which the containers are discharged onto conveyor 31, the arms 25, 26 and push bar 23 are disposed as illustrated in dotted lines in Fig. 1, the rotary arm 25 being normal to said bar. Referring to Fig. 2, continued rotary movement of arm 25 causes arm 26 to oscillate and bar 23 to shift through the positions illustrated respectively in solid and dotted lines in that figure. The arms and bar return eventually to the position illustrated in solid lines in Fig. 1 for laterally engaging with a second group of articles, which have in the meantime been advanced on conveyor 17 to the proper position for such engagement.

It will be noted by reference to Figs. 1 and 2 that the arm 25 is the only moving element in the mechanism which extends beyond the width of the frame 10, because of the unidirectional rotation of said arm. A substantial saving in space results, as well as a reduction of danger to an operator or other employee. The arm 26 merely oscillates over the frame and conveyor through a comparatively restricted angular range, well under 180°, and the movement of the arms and bar is such that the advancing articles 24 do not engage the bar, or either of the arms, until such time as the articles are in appropriate position for lateral transfer, illustrated in solid line in Fig. 1. As indicated in dotted lines in Fig. 2, the bar 23 swings outwardly relative to its general orbital path of bodily travel, while being retracted in a direction away from the conveyor 31, thus swinging wide of and avoiding interference with the leading article on the conveyor.

It will also be noted that no separate or additional provisions for actuating arm 26 are required, other than its bar-connection to arm 25. This amounts to a considerable simplification and reduction in cost of mechanisms of the present type, since duplicate or interconnected drives for the arms are unnecessary. Moreover, the length and consequent arc of swing of arm 26 are such that no possibility exists of its coming on to a dead-center position in alignment with bar 23. Transmission of power to the arm 26 is positive and effective under all conditions.

The space requirements of the mechanism may be still further reduced by employing the modified construction illustrated fragmentarily in Fig. 5, wherein parts similar to those illustrated in the other figures are similarly designated. In this figure the bar 23 is provided at its end adjacent the rotary operating arm 25 with a laterally extending lug or bracket 34 fixedly secured to the bar as by spot welding. Arm 25 is pivoted to the outer end of said lug, which functions as a lateral adapter extension for the push bar. In operation, it will be observed that the lateral throw of the arm 25 is considerably reduced, as illustrated in dotted lines, without loss of parallelism of bar 23 to the conveyor line at the commencement of the transfer phase, as shown in solid lines. Other modifications and refinements of this general type will readily suggest themselves to those skilled in the art.

I believe that a transfer mechanism, involving a longitudinally and laterally moving push bar correlated in speed with a linearly moving conveyor and driven by a linkage which maintains parallelism with said conveyor throughout the transfer phase of the operating cycle, is novel with me; in particular wherein the actuating instrumentalities embody a combined rotary-oscillatory arm and link movement for the purposes described above. I therefore do not desire the invention to be construed more narrowly than is necessitated by the scope of the appended claims.

What I claim is:

1. A transfer mechanism of the type described, comprising a linearly movable conveyor, means providing a discharge station adjacent said conveyor, a transfer member movable longitudinally and transversely of said conveyor in engagement with articles on the latter, whereby to discharge the articles to said station, a pair of horizontally swingable actuating arms pivoted to said member at spaced points thereon, means for rotating one of said arms unidirectionally at a speed correlated to the conveyor speed, and means pivotally mounting the other arm for reversible oscillatory movement derived solely from said first arm and member, said other arm describing an arc of less than 180° in its oscillation.

2. A transfer mechanism of the type described, comprising a linearly movable conveyor, means providing a discharge station adjacent said conveyor, an elongated transfer member movable longitudinally and transversely of said conveyor in engagement with articles on the latter, while maintaining substantially parallel relation to the line of movement of the conveyor, whereby to discharge the articles to said station, a pair of horizontally swingable actuating arms pivoted to said member at spaced points thereon, means for rotating one of said arms continuously and unidirectionally at a speed correlated to the conveyor speed, and means pivotally mounting the other arm for reversible oscillatory movement derived solely from said first arm and member, said other arm describing an arc of less than 180° in its oscillation.

3. A transfer mechanism of the type described, comprising a longitudinally extending conveyor adapted to travel linearly, means providing a discharge station to one side of said conveyor, an elongated push bar disposed above said conveyor and movable longitudinally and transversely of the conveyor in engagement with articles on the latter to discharge the articles to said station, a pair of actuating arms pivoted to and supporting said bar at spaced points thereon, means for rotating one of said arms unidirectionally, and means pivotally mounting the other arm for reversible oscillatory movement.

4. In a transfer mechanism for transferring articles from a longitudinally traveling conveyor onto a laterally advancing conveyor disposed angularly adjacent thereto, a pusher bar disposed above said first conveyor and engageable with articles thereon, and means to translate said bar longitudinally and laterally of said first conveyor, comprising a pair of pivotally mounted arms pivoted to said bar at spaced points thereon, means for unidirectionally rotating one of the arms, the other arm supporting the bar while oscillating in opposite angular directions solely under force transmitted thereto from said first arm through said bar.

5. In a transfer mechanism for transferring articles from a longitudinally traveling conveyor onto a laterally advancing conveyor disposed angularly adjacent thereto, a pusher bar disposed above said first conveyor and engageable with articles thereon, and means to translate said bar longitudinally and laterally of said first conveyor in timed relation to the speed of advance thereof, comprising a pair of pivotally mounted arms pivoted to said bar at spaced points thereon, means for continuously and unidirectionally rotating one of the arms at a speed correlated to the speed of the first conveyor, the other arm supporting the bar while oscillating in opposite angular directions solely under force transmitted thereto from said first arm through said bar.

6. In a transfer mechanism for transferring articles from a longitudinally traveling conveyor onto a laterally advancing conveyor disposed angularly adjacent thereto, a pusher bar disposed above said first conveyor and engageable with articles thereon, and means to translate said bar longitudinally and laterally of said first conveyor, comprising a pair of pivotally mounted arms pivoted to said bar at spaced points thereon, means for unidirectionally rotating one of the arms, the other arm supporting the bar while oscillating in opposite angular directions in an arc of less than 180° solely under force transmitted thereto from said first arm through said bar.

7. In a transfer mechanism for transferring articles from a longitudinally traveling conveyor onto a laterally advancing conveyor disposed angularly adjacent thereto, a pusher bar disposed above said first conveyor and engageable with articles thereon, and means to translate said bar longitudinally and laterally of said first conveyor in timed relation to the speed of advance thereof, comprising a pair of pivotally mounted arms pivoted to said bar at spaced points thereon, means for continuously and unidirectionally rotating one of the arms at a speed correlated to the speed of the first conveyor, the other arm supporting the bar while oscillating in opposite angular directions in an arc of less than 180° solely under force transmitted thereto from said first arm through said bar.

8. A transfer mechanism of the type described, comprising a longitudinally and continuously traveling conveyor, a laterally advancing conveyor adjacent one side thereof, an elongated pusher bar disposed above said first conveyor and engageable with a row of articles thereon in substantially parallel relation to said first conveyor, and means to translate said bar longitudinally in the direction of movement of and laterally across said first conveyor in timed relation to the speed of advance thereof, while maintaining the parallel relation of bar and conveyor, comprising a pair of pivotally mounted elongated arms pivoted to said bar at spaced points thereon, and means for imparting simultaneous angular movement to said arms, including means for continuously and unidirectionally rotating one of the arms at a speed correlated to the speed of the first conveyor, the other arm being reversely oscillatable and actuable solely under force transmitted from said first arm through said bar.

9. In combination with a longitudinally traveling article conveyor, an elongated push bar adjacent said conveyor adapted to engage a row of articles traveling longitudinally thereon and to shift said articles laterally toward a side of the conveyor while they are traveling on the latter, means operatively connected to said push bar to guide a portion of the same in an article engaging and retracting bodily movement which is characterized by longitudinal and lateral components of substantial size, means operatively connected to another portion of said push bar in spaced relation to said first named means to guide said last named portion in a bodily movement having a substantially smaller lateral component than imparted by said first named means, whereby said push bar pivots laterally relative to said row of articles in engaging and retracting from the same, and means to positively actuate at least one of said means.

10. In combination with a longitudinally traveling article conveyor, an elongated push bar adjacent said conveyor adapted to engage a row of articles traveling longitudinally thereon and to shift said articles laterally toward a side of the conveyor while they are traveling on the latter, means operatively connected to said push bar to guide a portion of the same in an article engaging and retracting bodily movement which is characterized by longitudinal and lateral components of substantial size, means operatively connected to another portion of said push bar in spaced relation to said first named means to guide said last named portion in a composite longitudinal and lateral bodily movement having a substantially smaller lateral component than imparted by said first named means, whereby said push bar pivots laterally relative to said row of articles in engaging and retracting from the same, and means to positively actuate at least one of said means.

11. In combination with a longitudinally traveling article conveyor, an elongated push bar adjacent said conveyor adapted to engage a row of articles traveling longitudinally thereon and to shift said articles laterally toward a side of the conveyor while they are traveling on the latter, a driven rotary arm operatively connected to said push bar to guide a portion of the same in an article engaging and retracting bodily movement which is characterized by longitudinal and lateral components of substantial size, means operatively connected to another portion of said push bar in spaced relation to said arm to guide said last named portion in a bodily movement having a substantially smaller lateral component than imparted by said arm, whereby said push bar pivots laterally relative to said row of articles in engaging and retracting from the same, and means to positively rotate said arm.

12. A mechanism for transferring articles a row at a time from a longitudinally moving conveyor on which the articles advance continuously forwardly in an endless line to a receiving station on one side of the conveyor, on which the articles are placed by the mechanism in generally parallel rows, comprising a push bar positioned longitudinally of the conveyor adjacent the side of the same opposite said receiving station, and means operating said bar in a generally orbital, non-parallelogram path across said conveyor from a fully retracted lateral position adjacent said last named conveyor side and in non-parallel relation to the line of travel of said conveyor to an opposite, fully advanced position in generally parallel relation to said line of conveyor travel and adjacent said receiving station, and vice versa, said bar operating means including means operatively connected to said bar, and means for driving said means to impart a substantially smaller component of transverse movement, in said orbital path, to the forward end of said bar which faces in the direction of travel of said conveyor than to the rear end of said bar.

13. A mechanism for transferring articles a row at a time from a longitudinally moving conveyor on which the articles advance continuously forwardly in an endless line to a receiving station on one side of the conveyor, on which the articles are placed by the mechanism in generally parallel rows, comprising a push bar positioned longitudinally of the conveyor adjacent the side of the same opposite said receiving station, and means operating said bar in a generally orbital, non-parallelogram path across said conveyor from a fully retracted lateral position adjacent said last named conveyor side and in non-parallel relation to the line of travel of said conveyor to an opposite, fully advanced position in generally parallel relation to said line of conveyor travel and adjacent said receiving station, and vice versa, said bar operating means including rotative means operatively connected respectively to said bar at spaced points along the length thereof, and means for rotatively driving said means to impart a substantially smaller component of transverse movement, in said orbital path, to the forward end of said bar which faces in the direction of travel of said conveyor than to the rear end of said bar.

LYNN E. DAVIES.

REFERENCES CITED

The following references are of record in the file of this patent:

UNITED STATES PATENTS

| Number | Name | Date |
|---|---|---|
| 1,871,676 | Ermold | Aug. 16, 1932 |
| 2,176,485 | Bronander | Oct. 17, 1939 |
| 2,359,252 | Seibert | Sept. 26, 1944 |